US011658867B1

(12) United States Patent
Kushwaha et al.

(10) Patent No.: US 11,658,867 B1
(45) Date of Patent: May 23, 2023

(54) ZERO-TOUCH DEPLOYMENT (ZTD) WITH ADAPTIVE NETWORK CONTROL POLICIES

(71) Applicant: Cisco Technology, Inc., San Jose, CA (US)

(72) Inventors: Manoj Kumar Kushwaha, Karnataka (IN); Scott Taft Potter, Stratford, CT (US); David Scott McCowan, Cary, NC (US); Shailendra Bhargava, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/727,484

(22) Filed: Apr. 22, 2022

(30) Foreign Application Priority Data

Feb. 26, 2022 (IN) .............................. 202241010362

(51) Int. Cl.
| | |
|---|---|
| *G06F 15/173* | (2006.01) |
| *H04L 41/0806* | (2022.01) |
| *H04L 43/0876* | (2022.01) |
| *H04L 41/0893* | (2022.01) |
| *H04L 41/0894* | (2022.01) |

(52) U.S. Cl.
CPC ...... *H04L 41/0809* (2013.01); *H04L 41/0893* (2013.01); *H04L 41/0894* (2022.05); *H04L 43/0876* (2013.01)

(58) Field of Classification Search
CPC ............. H04L 41/0809; H04L 41/0894; H04L 41/0893; H04L 43/0876
See application file for complete search history.

(56) References Cited

U.S. PATENT DOCUMENTS

| | | | |
|---|---|---|---|
| 2009/0182874 A1 | 7/2009 | Morford et al. | |
| 2018/0034701 A1 | 2/2018 | Nagesh et al. | |
| 2018/0115885 A1 | 4/2018 | Berzin et al. | |
| 2018/0191729 A1* | 7/2018 | Whittle | .................. H04L 67/01 |
| 2019/0058711 A1 | 2/2019 | Zhu et al. | |
| 2021/0392171 A1 | 12/2021 | Srinivas et al. | |

* cited by examiner

*Primary Examiner* — Wing F Chan
*Assistant Examiner* — Joseph R Maniwang
(74) *Attorney, Agent, or Firm* — Polsinelli

(57) ABSTRACT

The present disclosure is directed to systems and techniques for providing zero-touch deployment (ZTD) and/or adaptive network traffic control policy management for deployed Internet-of-Things (IoT) devices. In one example, the systems and techniques can include obtaining a network traffic policy from a network traffic control service and obtaining one or more data usage policies from an IoT hub. Data usage measurements can be obtained for a plurality of IoT devices. One or more IoT device traffic policies can be automatically generated based at least in part on the network traffic policy, the one or more data usage policies, and the data usage measurements. The IoT device traffic policies can be used to provision or configure at least a portion of the plurality of IoT devices.

20 Claims, 7 Drawing Sheets

ZERO-TOUCH DEPLOYMENT (ZTD) WITH ADAPTIVE NETWORK CONTROL POLICIES

CROSS-REFERENCE TO RELATED APPLICATIONS

This application claims the benefit of priority to Indian Provisional Patent Application No. 202241010362, filed Feb. 26, 2022 and entitled "ZERO-TOUCH DEPLOYMENT (ZTD) WITH ADAPTIVE NETWORK CONTROL POLICIES," the disclosure of which is herein incorporated by reference in its entirety.

TECHNICAL FIELD

The present technology pertains to wireless networks, and more particularly to providing traffic control policies in a zero-touch deployment (ZTD) of wireless Internet-of-Things (IoT) devices.

BACKGROUND

As Internet-of-Things (IoT) devices continue to grow in popularity, so too may the complexity of many IoT deployments. For example, enterprise IoT deployments may include thousands of different IoT devices, many of which consume wireless data and/or interact with multiple different networked entities. Moreover, different IoT devices may have different data usage patterns, data usage requirements, etc., all of which pose a challenge to ensuring that the varying needs of deployed IoT devices are being met. In some cases, the data consumption and/or data requirements of a given IoT device can change over time, for example when a IoT device is utilized for a new or different task.

The complexity of managing a fleet of deployed IoT devices, along with the complexity of managing the IoT device interactions with supporting infrastructure (e.g., databases), can be challenging to perform. The complexity of such tasks may grow non-linearly with factors that include, but are not limited to, the size of the IoT fleet deployment, the age of the deployment (e.g., the number of IoT devices deployed), the tasks performed by the IoT devices, the environment in which the IoT devices are deployed, the network entities to which the IoT devices are communicatively coupled, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
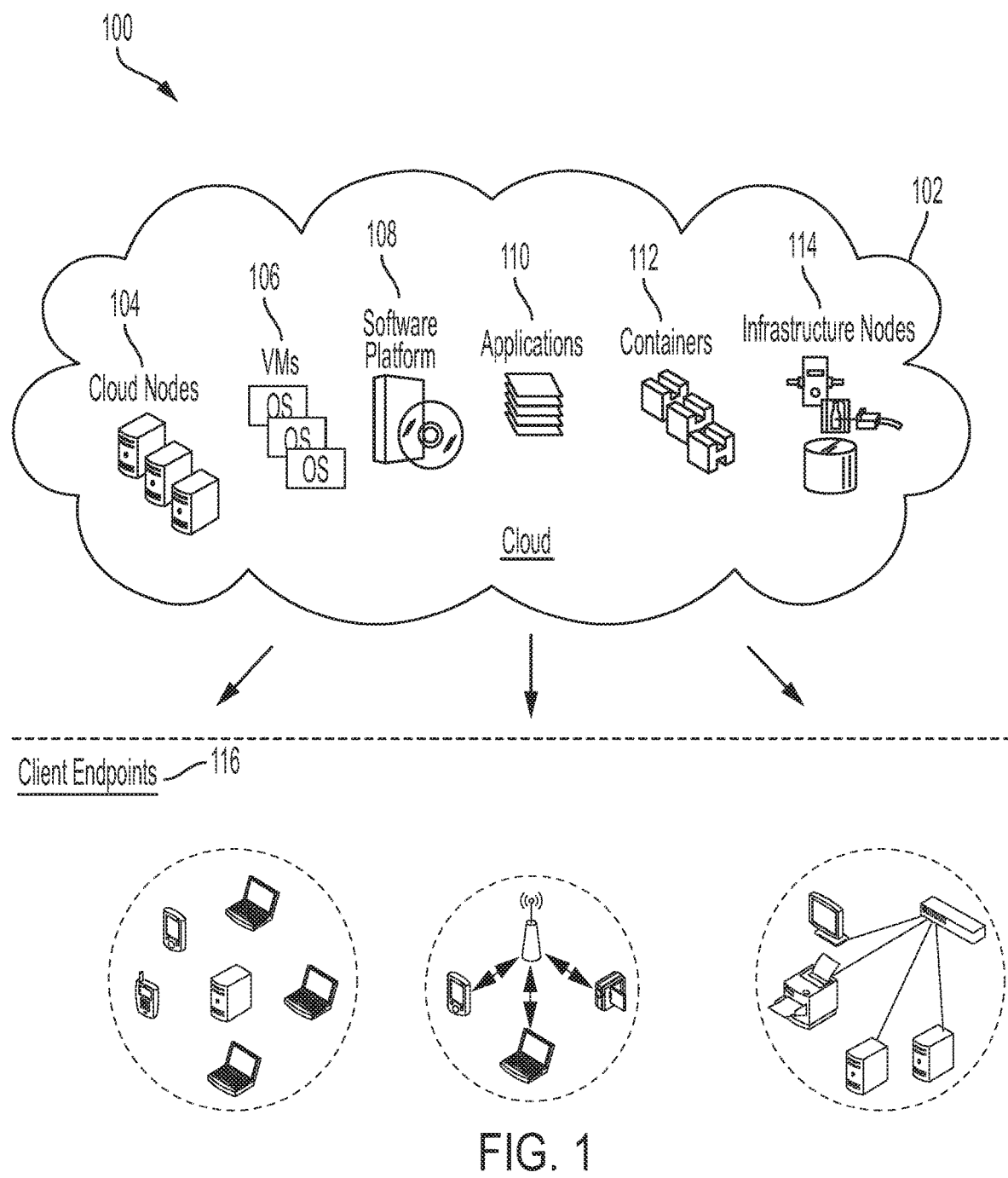
FIG. 1 illustrates an example cloud computing architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for providing zero-touch deployment (ZTD) and/or adaptive network traffic control policy management for a plurality of deployed IoT devices. In some embodiments, the plurality of deployed IoT devices can be connected to or otherwise communicate using a wireless (e.g., cellular) network. For example, the wireless network can be a fifth-generation (5G) network environment, although various other wireless networks (cellular or otherwise such as fourth generation (4G)/Long-Term Evolution (LTE)) may also be utilized without departing from the scope of the present disclosure. In some embodiments, a zero-touch deployment (ZTD) service can be used to provide coordination between different entities involved in a cellular IoT deployment (e.g., one or more cellular network service providers, a plurality of deployed IoT devices, and one or more IoT hubs or datacenters). The ZTD service can determine usage requirements for the plurality of deployed IoT devices based on one or more identified IoT hubs or datacenters that are associated with the plurality of deployed IoT devices. Subsequently, the ZTD service can automatically specify, configure, or otherwise implement one or more corresponding traffic control policies for the plurality of IoT devices (e.g., inside of the ZTD service and/or at the IoT devices). In some embodiments, the traffic control policies can be automatically specified, configured, or otherwise implemented for one or more IoT devices prior to the IoT devices being deployed, for example using a zero-touch deployment process. In some embodiments, the traffic control policies can be automatically specified, configured, or otherwise implemented for one or more deployed IoT devices, wherein the traffic control policies provide a dynamic update or reconfiguration to existing traffic control policies associated with the one or more deployed IoT devices. In some examples, aspects of the present disclosure can be utilized to provide adaptive network traffic control policies for multiple different instances, groupings, sets, etc., of IoT devices. For example, although the description provided herein makes reference to a plurality of IoT devices, it is noted that this is done for clarity of explanation—the following description can be applied equally to examples in which multiple pluralities of IoT devices are present.

In one aspect, a method includes obtaining a network traffic policy, wherein the network traffic policy is obtained from a network traffic control service; obtaining one or more data usage policies, wherein the one or more data usage policies are obtained from an Internet-of-Things (IoT) hub; obtaining data usage measurements for a plurality of IoT devices; and generating one or more IoT device traffic policies based at least in part on the network traffic policy, the one or more data usage policies, and the data usage measurements.

In another aspect, obtaining the one or more data usage policies includes obtaining one or more input traffic quota requirements from the IoT hub.

In another aspect, the method further includes receiving a selection from the one or more IoT device traffic policies; and automatically applying the selected IoT device traffic policy to one or more IoT devices in response to determining that one or more conditions associated with the selected IoT device traffic policy are met.

In another aspect, the one or more IoT device traffic policies are automatically generated by a zero-touch deployment (ZTD) service; the ZTD service automatically selects at least one of the one or more IoT device traffic policies in response to detecting an initial deployment of the one or more IoT devices; and the data usage measurements include a telemetry data usage requirement determined for the one or more IoT devices at the initial deployment.

In another aspect, the one or more IoT device traffic policies are specified at a portal of a zero-touch deployment (ZTD) service, the portal providing a selectable option for each of the one or more IoT device traffic policies.

In another aspect, the method further includes determining the telemetry data usage requirement based on one or more of a set of device identifiers associated with the one or more IoT devices or a historical telemetry data usage pattern measured for the one or more IoT devices.

In another aspect, a selected IoT device traffic policy is an adaptive IoT device traffic policy including one or more policy updates; the one or more IoT devices are previously deployed IoT devices; and automatically applying the selected IoT device traffic policy comprises automatically updating an existing IoT device traffic policy associated with the previously deployed IoT devices using the one or more policy updates.

In another aspect, the network traffic policy is obtained from one or more of a Policy and Charging Rules Function (PCRF) or a Policy Control Function (PCF) associated with a cellular network; and the data usage measurements for the plurality of IoT devices include data usage of the plurality of IoT devices on the cellular network.

In one aspect, a system is provided that includes one or more processors and one or more computer-readable storage media having computer-readable instructions stored thereon, wherein the computer-readable instructions, when executed by the one or more processors, cause the one or more processors to obtain a network traffic policy, wherein the network traffic policy is obtained from a network traffic control service; obtain one or more data usage policies, wherein the one or more data usage policies are obtained from an Internet-of-Things (IoT) hub; obtain data usage measurements for a plurality of IoT devices; and generate one or more IoT device traffic policies based at least in part on the network traffic policy, the one or more data usage policies, and the data usage measurements.

In one aspect, one or more non-transitory computer-readable media includes computer-readable instructions that, when executed by one or more processors of a cloud-based deployment service, cause the cloud based deployment service to obtain a network traffic policy, wherein the network traffic policy is obtained from a network traffic control service; obtain one or more data usage policies, wherein the one or more data usage policies are obtained from an Internet-of-Things (IoT) hub; obtain data usage measurements for a plurality of IoT devices; and generate one or more IoT device traffic policies based at least in part on the network traffic policy, the one or more data usage policies, and the data usage measurements.

In one aspect, an apparatus is provided. The apparatus includes means for obtaining a network traffic policy, wherein the network traffic policy is obtained from a network traffic control service; obtaining one or more data usage policies, wherein the one or more data usage policies are obtained from an Internet-of-Things (IoT) hub; obtaining data usage measurements for a plurality of IoT devices; and generating one or more IoT device traffic policies based at least in part on the network traffic policy, the one or more data usage policies, and the data usage measurements.

Example Embodiments

In some examples, an IoT deployment can be provided as a cellular IoT deployment, in which IoT devices are connected to and/or communicate with a wireless cellular network. Cellular IoT (Internet-of-Things) deployments may involve three primary entities or groups of devices. The first entity is a cellular service provider. For example, the cellular service provider can be the owner or operator of a cellular network. The second entity comprises a plurality of enterprise devices (e.g., IoT devices). The IoT devices connect to the cellular service provider and consume data using the cellular service provider's network. The third entity comprises IoT hubs and/or collection datacenters.

IoT hubs can receive data transmitted by the IoT devices over the cellular service provider's network. For example, the IoT hubs can be public IoT hubs or private data centers. The IoT hubs can manage the sending and storage of IoT and/or telemetry data from the IoT devices. For example, the IoT hubs can impose traffic restrictions to meter or limit the flow of input data received from the IoT devices (e.g., a traffic restriction might limit an IoT device to 100 MB of cellular data usage per day). The IoT hubs can also manage data consumption charges.

Although all three entities may be involved in implementing or otherwise providing cellular IoT deployments, these three entities may not work in a collaborative or synchronized fashion. In other words, several problems have not yet been addressed in terms of synchronization between these three entities and in terms of management of deployed IoT devices. For example, existing approaches for cellular IoT deployments have not addressed the challenge of providing correlation or synchronization between IoT hubs users (e.g., enterprises, businesses, individuals, etc.) that operate IoT devices. In some cases, traffic management or traffic restriction policies can be established during the initial configuration and deployment of an enterprise's IoT devices, but these policies are difficult or impossible to dynamically reconfigure at a later time, for example leading to data loss when an IoT device becomes traffic-restricted. Moreover, the lack of synchronization between IoT hubs and operators of IoT devices results in the IoT device operators (e.g., enterprises) having no way to account for changes over time in the data usage or consumption patterns of their already deployed IoT devices.

Therefore, there exists a need for an IoT device deployment and/or management tool that can provide efficient, reliable, flexible, and/or adaptive management of network traffic control policies for a plurality of deployed IoT devices. There is also a need for an IoT device deployment and/or management tool that can enable zero-touch deployment (ZTD) and dynamic updating and reconfiguration abilities to the network traffic control policies for a plurality of deployed IoT devices.

The present technology includes systems, methods, and computer-readable media for solving these problems and discrepancies. More specifically and as will be described below with reference to FIG. 5, a ZTD service is provided to address these problems and more, for example by specifying synchronized adaptive network traffic control policies between the various entities associated with providing a cellular IoT deployment. Such ZTD service can be included in a network environment or otherwise communicatively coupled to one or more of IoT devices, an enterprise network, a device management platform, a certificate authority (CA), and an IoT hub. In some examples, the ZTD service can be a cloud-based deployment service. As will be described in greater depth below, the ZTD service can be utilized (e.g., by an enterprise) to obtain synchronization between their IoT devices, the cellular service provider, and the IoT hub provider. The example ZTD service can additionally be utilized to permit enterprise or other IoT device users to easily and efficiently manage a fleet of deployed IoT devices (e.g., the IoT devices) and their cellular network bandwidth using one or more adaptive network traffic control policies. For example, the ZTD service can allow enterprises to determine usage requirements for their IoT devices based on an associated IoT hub, and subsequently specify one or more traffic control policies inside of the ZTD service.

Figure 2:
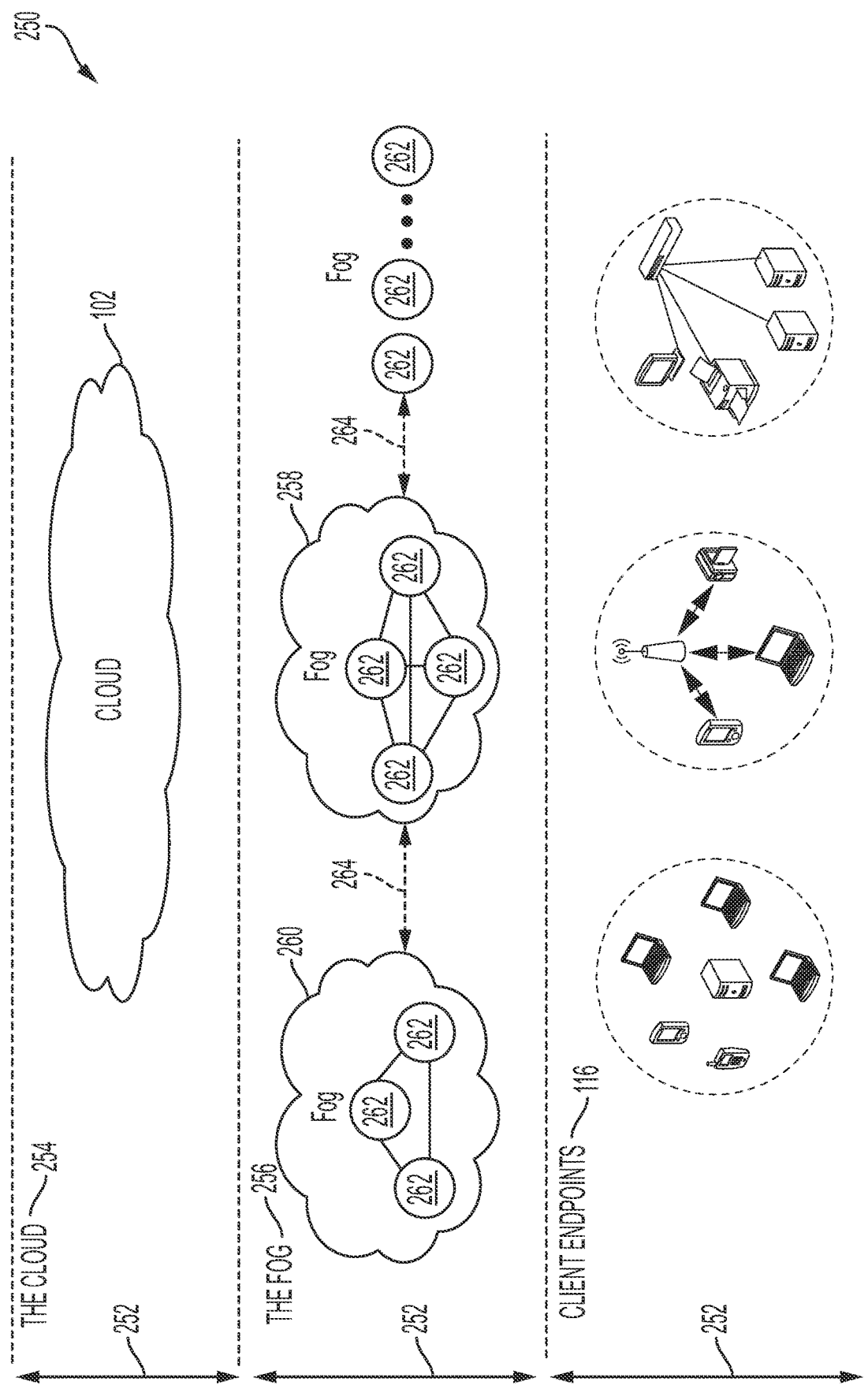
FIG. 2 illustrates an example fog computing architecture, according to some aspects of the present disclosure.

A description of example network environments and architectures for network data access and services, as illustrated in FIGS. 1 and 2, is first disclosed herein. One or more examples of a ZTD architecture and ZTD agent are described with reference to FIGS. 3 and 4. An example network environment and associated network flow for providing adaptive network traffic control policies for zero-touch deployment (ZTD) and/or dynamic reconfiguration of one or more Internet-of-Things (IoT) devices are then described with reference to FIG. 5. Example processes for adaptive network traffic control policies for ZTD and/or dynamic reconfiguration of IoT devices are described next with reference to FIG. 6. The discussion then concludes with a brief description of example devices, as illustrated in FIG. 7.

FIG. 1 illustrates an example cloud computing architecture, according to some aspects of the present disclosure. Cloud computing architecture 100 can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 2 illustrates an example fog computing architecture, according to some aspects of the present disclosure. The fog computing architecture 250 can include the cloud layer 254, which includes the cloud 102 of FIG. 1 and any other cloud system or environment, and the fog layer 256, which includes fog nodes 262. The client endpoints 116 (same as in FIG. 1) can communicate with the cloud layer 254 and/or the fog layer 256. The architecture 250 can include one or more communication links 252 between the cloud layer 254, the fog layer 256, and the client endpoints 116. Communications can flow up to the cloud layer 154 and/or down to the client endpoints 116.

The fog layer 256 or "the fog" provides the computation, storage and networking capabilities of traditional cloud networks, but closer to the endpoints. The fog can thus extend the cloud 102 to be closer to the client endpoints 216. The fog nodes 262 can be the physical implementation of fog networks. Moreover, the fog nodes 262 can provide local or regional services and/or connectivity to the client endpoints 116. As a result, traffic and/or data can be offloaded from the cloud 102 to the fog layer 256 (e.g., via fog nodes 262). The fog layer 256 can thus provide faster services and/or connectivity to the client endpoints 116, with lower latency, as well as other advantages such as security benefits from keeping the data inside the local or regional network(s).

The fog nodes 262 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 262 can be deployed within fog instances 258, 260. The fog instances 258, 258 can be local or regional clouds or networks. For example, the fog instances 256, 258 can be a regional cloud or data center, a local area network, a network of fog nodes 262, etc. In some configurations, one or more fog nodes 262 can be deployed within a network, or as standalone or individual nodes, for example. Moreover, one or more of the fog nodes 262 can be interconnected with each other via links 264 in various topologies, including star, ring, mesh or hierarchical arrangements, for example.

In some cases, one or more fog nodes 262 can be mobile fog nodes. The mobile fog nodes can move to different geographical locations, logical locations or networks, and/or fog instances while maintaining connectivity with the cloud layer 254 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 254 while located at the starting location and switch to a different physical and/or logical connection point with the cloud 254 while located at the destination location. The particular fog node can thus move within particular clouds and/or fog instances and, therefore, serve endpoints from different locations at different times.

Figure 3:
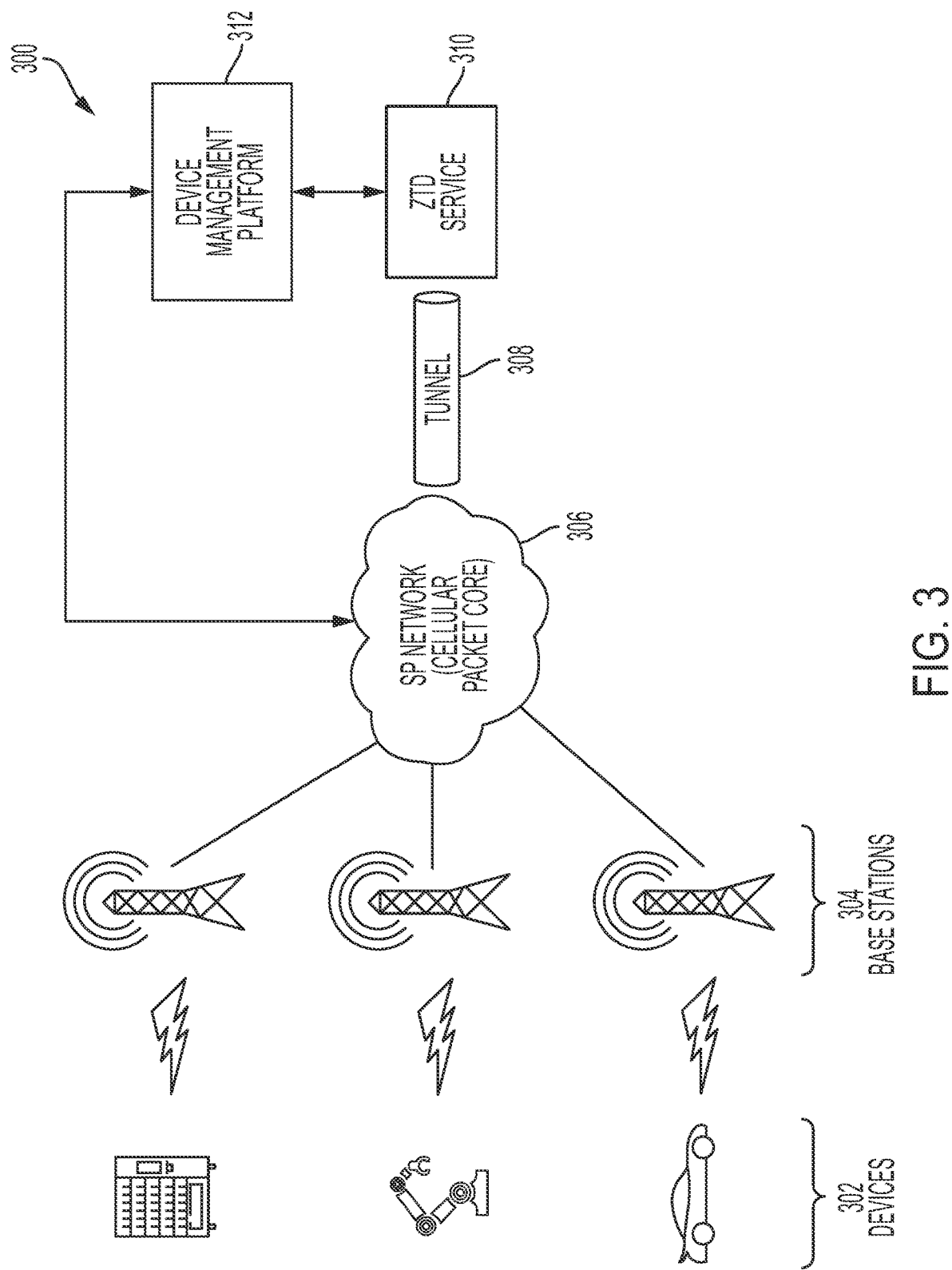
FIG. 3 illustrates an example architecture for zero-touch deployment (ZTD) of network devices, according to some aspects of the present disclosure.

FIG. 3 illustrates an example architecture for the zero-touch deployment (ZTD) of network devices, according to some aspects of the present disclosure. Architecture 300 may include any number of IoT devices 302 that are to be onboarded to a device management platform 312, such as Control Center developed by Cisco Systems, Inc., or the like. In some examples, onboarding of base stations 304 to device management platform 312 may be facilitated by a ZTD service 310 that communicates with IoT devices 302 via a cellular network that comprises any number of base stations 304 (e.g., cell towers, e-NodeBs, etc.) and a service provider (SP) network 306 that functions as the packet core for the cellular network. It is noted that, while ZTD service 310 and device management platform 312 are shown as distinct entities in architecture 300, in some cases the function(s) of ZTD service 310 and/or device management platform 312 may be combined or omitted.

In some examples, the IoT devices 302 can include, but are not limited to, cellular phones, laptops, tablets, vending equipment, automation equipment, vehicles, sensors (e.g., temperature sensors, pressure sensors, humidity sensors, etc.), actuators, drones, other forms of IoT devices, and the like. The IoT devices 302 may be the same as client endpoints 116 described above with reference to FIGS. 1 and 2. In some cases, each IoT device 302 may be configured to communicate via a cellular connection with a cellular network. Accordingly, each IoT device 302 may include a subscriber identification module (SIM) card, eSIM, iSIM, or the like.

Subscriber identification module (SIM) cards can be removable cards that store the authentication information needed for a device (e.g., IoT devices 302) to access a cellular network. For example, the authentication information can include a device's international mobile subscriber identity (IMSI) number, integrated circuit card ID (ICCID), etc. There is a well-developed procurement, deployment, and authentication process that scales to billions of cellular connected IoT devices. In some examples, this process can be leveraged to implement ZTD by using the SIM as the root of trust for purposes of bootstrapping onboarding of the IoT device(s) 302 to a corresponding management platform 312.

In some cases, SIMS may be owned by service providers (e.g., also referred to as mobile network operators). In some examples, eSIMs can be used to provide switching between service providers without needing to physically swap SIM cards. Instead of taking the form of a removable card, an eSIM can be provided as a much smaller chip that is permanently soldered onto the device. In addition, eSIMs support remote management, which can allow an administrator to easily change the account or profile of a given device and/or migrate the device to a different cellular network.

iSIMs can additionally, or alternatively, be utilized according to one or more examples of the present disclosure. Like eSIMs, iSIMs can be integrated directly into a device (e.g., IoT device(s) 302) and are non-swappable. iSIMs can also support remote management for use in IoT devices such as the IoT devices 302. In some cases, an iSIM may require less supporting hardware than an eSIM. For example, eSIMs may typically require their own processors and other hardware components, which can increase the hardware footprint of an associated device considerably. iSIMs can be provided in a manner that is further integrated into the hardware of their associated devices (e.g., as part of an overall System-on-a-Chip (SoC) solution for the device).

In one illustrative example, leveraging the procurement, deployment, and the authentication processes of SIM/eSIM/iSIM/etc. to bootstrap ZTD can eliminate many friction points that exist in current cellular device onboarding processes. For example, to initiate an onboarding process, each IoT device 302 may execute a ZTD agent that interfaces with the SIM/eSIM/iSIM/etc. of the IoT device 302 to be onboarded.

Figure 4:
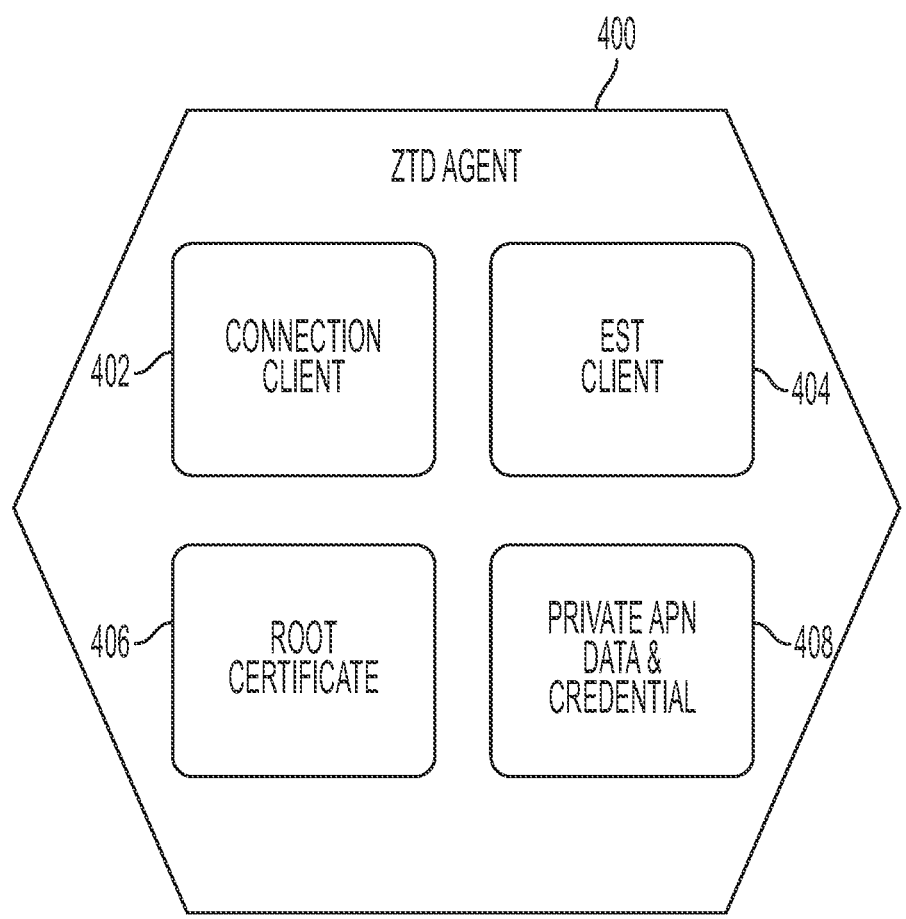
FIG. 4 illustrates an example ZTD agent, according to some aspects of the present disclosure.

FIG. 4 illustrates an example ZTD agent, according to some aspects of the present disclosure. As illustrated, ZTD agent 400 may include any or all of the following sub-components: a connection client 402, an Enrollment over Secure Transport (EST) client 404, a root certificate 406, and/or a private APN data and credential 408. In some examples, one or more of the sub-components 402-408 can be combined, omitted, or integrated into other processes, without departing from the scope of the present disclosure.

In one illustrative example, ZTD agent 400 can be installed to an endpoint device (e.g., one or more of the IoT devices 302 illustrated in FIG. 3) during the manufacture of the endpoint device. In some aspects, ZTD agent 400 can be used across any number of different end users/entities and deployments (e.g., companies, schools, governments, etc.) without requiring customization specific to a particular end user/entity and/or deployment. In some examples, ZTD agent 400 can be provided or otherwise utilized without the need for the manufacturer to install one or more certificates.

During the onboarding process, connection client 402 can be used to establish an initial connection between a device executing the ZTD agent 400 (e.g., an IoT device 302) and a ZTD service. For example, with reference to the examples of FIGS. 3 and 4, the connection client 402 executed by an IoT device 302 can cause the IoT device 302 to connect with a corresponding base station 304 and send a registration request to ZTD service 310.

In some examples, EST client 404 can be used to manage and request the installation of certificates to the device executing ZTD agent 400. For example, EST client 404 can manage and/or request the installation of one or more certificates that are associated with an entity (e.g., an enterprise or other user) that owns the IoT device 302. Details on the EST protocol can be found in the Internet Engineering Task Force (IETF) Request for Comments 7030 entitled, "Enrollment over Secure Transport" by Pritiken, et al. In some examples, EST client 404 can be provided as another client sub-component of ZTD agent 400 that relies on another certificate management protocol.

Root certificate 406 can be used by ZTD agent 400 to authenticate the executing device during its communications with its corresponding service. Such a certificate may be issued by a certificate authority (CA), in accordance with a public key infrastructure framework.

Private APN data and credentials 408 can be used by ZTD agent 400 to connect its device to a private APN operated by the cellular carrier and associated with the ZTD service. For example, as illustrated in FIG. 3, the ZTD agent (e.g., ZTD agent 400) of an IoT device 302 may supply the private APN and credentials 408 to the IoT device 302, such that the IoT device 302 can connect to an APN associated with the provider of ZTD service 310. In some examples, the private APN can allow the IoT device 302 to access the cellular carrier's network 306 via a minimal data plan for purposes of onboarding the IoT device 302. As a result, in some examples a secure tunnel 308 associated with the APN can be formed with ZTD service 310. In some cases, network services such as Domain Name System (DNS) services, Dynamic Host Configuration Protocol (DHCP) services, etc., in network 306 can be controlled in this captive network.

From the standpoint of ZTD service 310, the above approach can help ensure network security, as only allowed/known IoT devices 302 (e.g., devices with known SIMs) can connect to ZTD service 310 through a corresponding tunnel 308 connecting the service provider (SP) network 306 to that of ZTD service 310. In some examples, one or more of the IoT devices 302 may be known via their SIM/eSIM/iSIM information, which is also known by the device management platform 312 via its SIM onboarding workflow.

In some examples, the IoT devices 302 effectively connect to a private ZTD network using private APN and a virtual private network (VPN) tunnel 308, and ZTD services from ZTD service 310 are not accessible from the public Internet. In some cases, the original IP headers of packets sent by IoT devices 302 to ZTD service 310 are not modified, such as by a network address translation (NAT) service. It is additionally noted that one or more of the IoT devices 302 themselves may not be accessible by any service other than ZTD service 302 during the onboarding process, providing additional security.

In some examples, the cellular SP network 306 can be configured to work with both the private APN associated with ZTD service 310, as well as with a target APN. In some examples, the cellular SP network 306 may be reconfigured to allow the SIM/eSIM/iSIM/etc., of an IoT device 302 to switch to the target APN in an orchestrated manner during onboarding of the IoT device 302.

Figure 5:
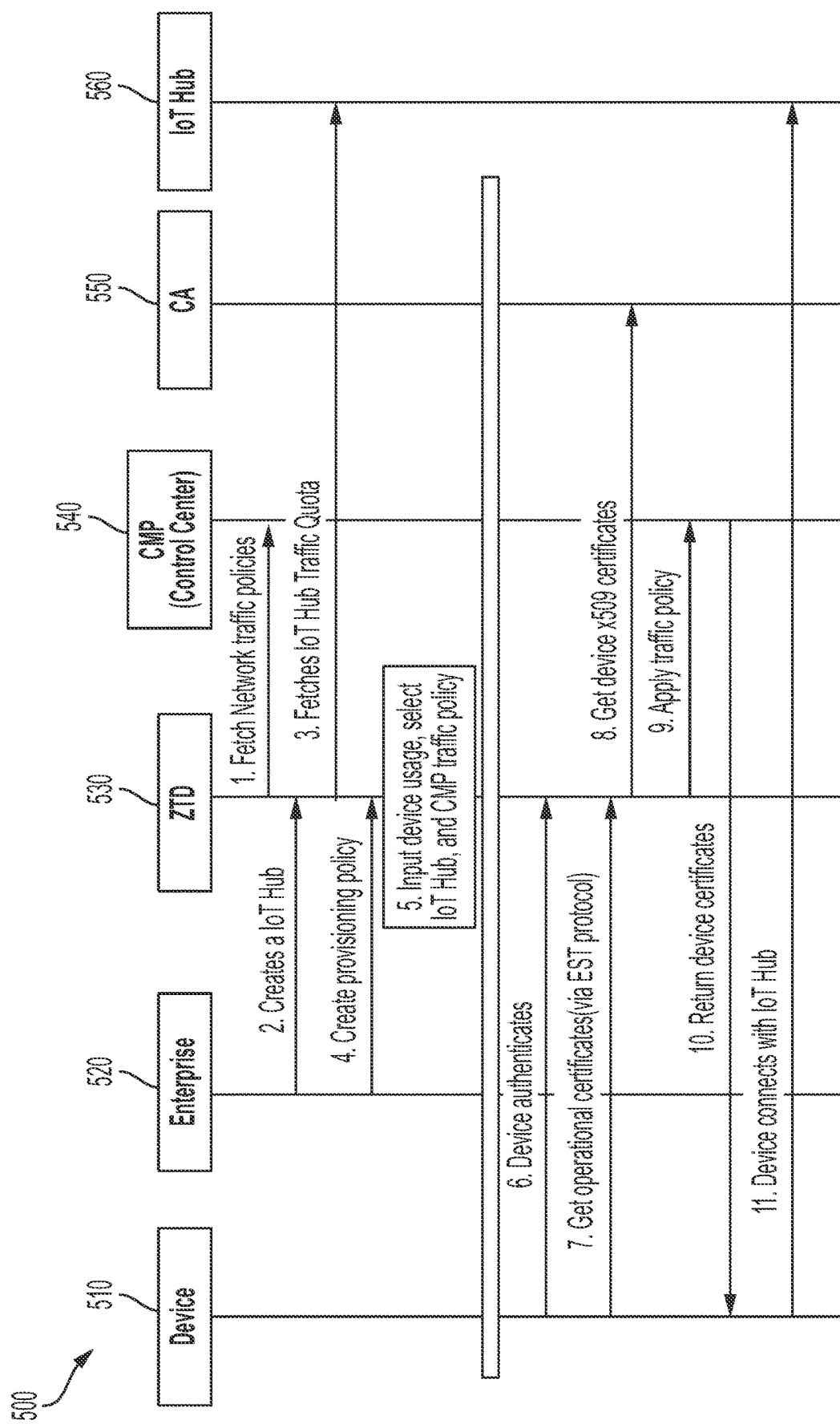
FIG. 5 illustrates an example network environment and network flow for adaptive network traffic control policies, according to some aspects of the present disclosure.

The disclosure turns now to FIG. 5, which depicts an example network environment and associated network flow for providing adaptive network traffic control policies, according to some aspects of the present disclosure. The flow 500 of FIG. 5 may be utilized for zero-touch deployment (ZTD) and/or dynamic reconfiguration of one or more Internet-of-Things (IoT) devices. As illustrated in FIG. 5, the example network environment includes a plurality of network components and/or network entities (e.g., 510, 520, 530, 540, 550, 560), although it is noted that one or more of the depicted network components 510-560 can be divided into multiple sub-components to provide a network environment having a greater quantity of network components than is depicted in the example of FIG. 5. Additionally, or alternatively, in some embodiments one or more of the depicted network components 510-560 can be combined into aggregate network components to provide a network environment having a lesser quantity of network components than is depicted in the example of FIG. 5. Below the network components 510-560 are a series of data flows and communications according to aspects of the present disclosure. The network components 510-560 and the series of data flows and communications will each be described in turn below.

As illustrated in FIG. 5, the example network environment 500 can include: one or more IoT devices 510 (which can be the same as client endpoints 116 described above with reference to FIGS. 1 and 2 and/or devices 302 described above with reference to FIG. 3); an IoT device operator 520 (depicted here as enterprise 520); a zero-touch deployment (ZTD) service 530 (which can be the same as ZTD service 310 described above with reference to FIG. 3); a configuration management platform (CMP) 540 (also referred to herein as a "control center" and can be the same as device management platform 312 of FIG. 3); a certificate authority (CA) 550; and an IoT hub 560. In some embodiments, example network environment 500 can be a wireless network environment, including, but not limited to, a public or private cellular network (e.g., 5G, 4G, etc.). In some examples, ZTD service 530 can be a cloud-based deployment service (e.g., ZTD service 530 can also be referred to herein as a "cloud-based deployment service").

As mentioned previously, multiple entities or groups of devices can be utilized in providing cellular IoT device deployments: a plurality of IoT devices, a cellular service provider, and at least one IoT hub and/or collection datacenter. These entities are discussed in turn below, in the context of example network environment 500 of FIG. 5.

In one illustrative example, the plurality of IoT devices can include IoT device(s) 510 depicted in FIG. 5. IoT device(s) 510 can, for example, be associated with enterprise 520 (e.g., as the owner, operator, user, etc., of IoT devices 510). IoT devices 510 can be uniform in composition (e.g., some or all of IoT devices 510 can be the same) or non-uniform in composition (e.g., some or all of IoT devices 510 can be different). IoT devices 510 can be provided in static deployments, wherein one or more IoT devices are installed at a fixed location such as a factory floor, data center, office building, etc. IoT devices 510 may additionally be provided in mobile deployments, wherein one or more IoT devices are installed on a moving object such as a vehicle (or are otherwise themselves capable of movement). In operation, IoT devices 510 can consume data and/or can transmit data. Incoming and outgoing data at IoT devices 510 can be communicated over wireless network 500. For example, in some embodiments IoT devices 510 can receive input data, commands, queries, etc., from enterprise 520 or from other ones of IoT devices 510. IoT devices 510 can transmit data (e.g., telemetry data) to IoT hubs or private data centers. For example, data transmissions from IoT devices 510 can include telemetry data, which can be processed or analyzed remote from IoT devices 510, e.g., at or by IoT hub 560.

The cellular service provider can be associated with or otherwise provide a wireless cellular communication network, which in the context of the present example can be the same as or otherwise include example network environment 500. The cellular service provider may also be associated with or otherwise provide configuration management platform (CMP) 540. The cellular communication network can be public, private, or a combination of the two. In some examples, the cellular communication network can include multiple sub-networks and/or various combinations of multiple networks into an aggregate wireless cellular communication network over which IoT devices 510 can transmit and/or receive data. In some embodiments, the cellular service provider (also referred to as a "network service provider") may control the network usage (e.g., data usage or data consumption) of attached devices, such as IoT devices 510 once they are deployed. The cellular service provider can, for example, control the network usage of IoT devices 510 via a Policy and Charging Rules Function (PCRF), a Policy Control Function (PCF), and/or other Network Functions (NFs) included in example network environment 500 for such purposes (not shown). In some examples, the network usage of IoT devices 510 can be controlled via one or more Policy and Charging Control (PCC) rules and/or an online charging system (OCS) implemented in example network environment 500 by the network service provider (e.g., the cellular service provider).

The at least one IoT hub and/or collection datacenter can include the illustrated IoT hub 560, although it is noted that a greater number of IoT hubs 560 may also be utilized without departing from the scope of the present disclosure. IoT hub(s) 560 can include one or more public IoT hubs, datacenters, cloud storage systems, etc. IoT hub(s) 560 can additionally, or alternatively, include one or more private IoT hubs, datacenters, cloud storage systems, etc. In some embodiments, it is contemplated that IoT devices 510 can utilize IoT hub(s) 560 for the sending and storage of telemetry data (and/or other data generated or received at IoT devices 510). IoT hub(s) 560 can implement one or more sets of input traffic restrictions, based on factors such as bandwidth, data consumption, priority tiers, etc. In some cases, IoT hub(s) 560 can manage charging (e.g., to enterprise 520 or other user(s) associated with IoT devices 510) based on different tiers and/or quotas. In some cases, IoT hub(s) 560 can include input traffic restrictions that specify parameters such as packet size and different charging methodologies.

As described above, challenges can arise in synchronization between enterprise 520 (e.g., the operator or user or IoT devices 510), the cellular service provider (e.g., associated with example network environment 500 and CMP 540), and the IoT hub provider (e.g., associated with IoT hub 540). For example, traffic-based and/or data usage-based charging policies are implemented by both the cellular service provider or CMP 540 and IoT hub 560—a lack of synchronization can result in enterprise 520 being excessively charged from one of (or both) the cellular service provider and the IoT hub provider.

Notably, the data consumption pattern(s) associated with IoT devices 510 can be variable or otherwise change over time. For example, in normal operation, one or more of IoT devices 510 may use a baseline amount of cellular data that is approximately a constant or predictable amount. However, various scenarios can cause abrupt increases in the amount of cellular data the is consumed by IoT devices 510. For example, an IoT device that requires a firmware update, a software update, etc., will likely have a data consumption in excess of its baseline amount when the IoT device downloads the update. In another example, the baseline data usage may be exceeded when a rogue or malicious IoT device is present within the plurality of IoT devices 510 (e.g., a rogue or malicious IoT sensor may increase the size and/or frequency of its data transmissions above the expected baseline amount).

Moreover, the traffic-based and/or data usage-based charging policies implemented by both the cellular service provider/CMP 540 and IoT hub 560 may additionally include one or more traffic restrictions that are imposed based on certain usage thresholds. A lack of synchronization or a lack of visibility of IoT device data usage to enterprise 520 can result in undesired data loss, e.g., such as when one or more of IoT devices 510 trigger a traffic restriction threshold at the cellular network (e.g., associated with FIG. 5) and/or IoT hub 560 while enterprise user 520 remains unaware. The lack of synchronization between entities participating in a cellular IoT device deployment and/or visibility into IoT device data usage patterns can additionally lead to misuse by malicious users and/or devices.

In some cases, it can be difficult to account for any changes in the data usage or data consumption pattern(s) of IoT devices 510, as such changes can require updated network traffic control policies at both the cellular network provider (e.g., at CMP 540) and the IoT hub provider (e.g., at IoT hub 560). The cumulative impact of such changes may also need to be determined across the aggregate data usage and/or data consumption patterns of the overall fleet of deployed IoT devices 510, before any specific updates can be propagated to or synchronized with the cellular network provider or the IoT hub provider. In some examples, changes in the data usage or data consumption patterns of IoT devices 510 can result from changes in the particular task(s) for which IoT devices 510 are utilized. Changes can also result from various software and/or firmware updates provided to or otherwise associated with IoT devices 510.

Accordingly, the zero-touch deployment (ZTD) service 530 described herein can include systems and techniques to address these problems and more, for example by specifying adaptive network traffic control policies between the various entities associated with providing a cellular IoT deployment. As illustrated in FIG. 5, ZTD service 530 can be included in the network environment 500 or otherwise communicatively coupled to one or more of IoT devices 510, enterprise 520, CMP 540, certificate authority (CA) 550, and IoT hub 560. As will be described in greater depth below, ZTD service 530 can be utilized (e.g., by enterprise 520) to obtain synchronization between IoT devices 510, the cellular service provider, and the IoT hub provider. ZTD service 530 can additionally be utilized to permit enterprise 530 or other IoT device users to easily and efficiently manage a fleet of deployed IoT devices (e.g., IoT devices 510) and their cellular network bandwidth using one or more adaptive network traffic control policies. For example, ZTD service 530 can allow enterprises (such as enterprise 520) to calculate usage requirements for their IoT devices (such as IoT devices 510) based on an associated IoT hub (such as IoT hub 560), and subsequently specify one or more traffic control policies inside of ZTD service 530.

The disclosure turns now to the example process flow that is illustrated in FIG. 5. Eleven different steps are identified, although it is appreciated that a greater or lesser number of steps and/or different ordering(s) and/or combination(s) of the illustrated example steps can be utilized without departing from the scope of the present disclosure. Connecting lines with arrows indicate the entities, components, services, etc., that may be involved in a given step, although it is appreciated that different components can be utilized for various steps without departing from the scope of the present disclosure. It is additionally noted that the example process flow of FIG. 5 is illustrated with steps 1-11 for purposes of clarity of explanation, e.g., the steps can be performed in a different order than is illustrated in FIG. 5, and/or multiple steps can be performed concurrently, without departing from the scope of the present disclosure.

At step 1, ZTD service 530 fetches or otherwise obtains one or more network traffic policies from CMP 540. In some embodiments, the network traffic policies can be defined in CMP 540 by enterprise 520. In some examples, the network traffic policies can be defined in CMP 540 by the cellular service provider associated with example network 500. The network traffic policies can specify one or more charging functions and/or data usage limitations, quotas, or thresholds imposed by the network provider associated with example network environment 500 (e.g., a cellular service provider). In some cases, the network traffic policies can be defined in CMP 540 by a combination of enterprise 520 and the cellular service provider associated with example network 500, e.g., based on one or more agreed-upon charging rules, parameters, etc., agreed upon between enterprise 520 and the cellular service provider for network 500.

In some examples, ZTD service 530 can fetch or obtain the one or more network traffic policies that are implemented in network 500 by a Policy and Charging Rules Function (PCRF), a Policy Control Function (PCF), and/or other Network Functions (NFs) included in example network environment 500 for such purposes. In some examples, ZTD service 530 can fetch or obtain one or more network traffic policies that are implemented in network 500 as one or more Policy and Charging Control (PCC) rules and/or implemented by an online charging system (OCS) associated with example network environment 500. In some embodiments, the network traffic policies can be fetched by ZTD service 530 on a periodic basis, or in response to a request received from enterprise 520. ZTD service 530 can obtain the network traffic policies from CMP 540 on a push or pull basis. In some embodiments, fetched network traffic policies can be stored by ZTD service 530 in association with a user account, identifier, etc., that is associated with one or more of enterprise 520 and/or the enterprise's IoT devices 510.

At step 2, enterprise 520 creates a pseudo IoT hub within ZTD service 530. For example, the pseudo IoT hub within ZTD service 530 can represent one or more actual IoT hubs (public or private) to which enterprise 520 may wish to connect its IoT devices 510. In some cases, the pseudo IoT hub can be selected from a listing of a plurality of different IoT hubs with which it is possible to connect one or more IoT devices. The particular pseudo IoT hub that is created in ZTD service 530 by enterprise 520 can correspond to the particular IoT hub 560 that is utilized (or selected for use) by enterprise 520 with its IoT devices 510. In some examples, the pseudo IoT hub created in ZTD service 530 can include or specify one or more parameters for ZTD service 530 to use in establishing a connection with, or otherwise communicating with, a particular IoT hub 560 selected for use by enterprise 520.

At step 3, based at least in part on the pseudo IoT hub created to correspond to IoT hub 560, ZTD service 530 fetches one or more traffic quota requirements from IoT hub 560. As mentioned previously, the traffic quota requirements associated with IoT hub 560 can include a plurality of different requirements, restrictions, charging policies, etc., applied by IoT hub 560 to input data traffic, such as the data generated and transmitted by IoT devices 510. In some embodiments, the traffic quota requirements associated with IoT hub 560 can include factors such as a number of messages, a size of messages, geographic sectors or locations of transmission (e.g., location(s) of the deployed IoT devices 510), etc. In some embodiments, ZTD service 530 can fetch all of the different traffic quota requirements and/or policies applied by or otherwise associated with IoT hub 560. ZTD service 530 can fetch the IoT hub traffic quota requirements and/or policies on a push or pull basis.

At steps 4 and 5, a provisioning policy can be created in ZTD service 530, based on inputs that can include, but are not limited to, factors such as data usage requirements for various ones of IoT devices 510, a selection of a particular IoT hub (e.g., IoT hub 560) for use with various ones of IoT devices 510, and a selection of one or more of the CMP traffic policies (e.g., fetched by ZTD service 530 in step (1)). In some embodiments, ZTD service 530 can automatically create a single provisioning policy based on the three selections described above, one or more (or all) of which can be provided by enterprise 520. In other words, ZTD service 530 can derive a single, composite network traffic policy for IoT devices 510, cellular service provider/network 500, and IoT hub 560.

In some examples, ZTD service 530 can automatically generate one or more provisioning policies based on the IoT device telemetry data usage requirement (e.g., specified on a per day basis), the different network traffic control policies on the cellular service provider side, and the different traffic quotas/policies on the selected or specified IoT hub 560 side. In some embodiments, ZTD service 530 can include a user interface or portal in which the automatically generated provisioning policies (and/or selectable options for each of the automatically generated provisioning policies) are presented to a user (e.g., enterprise 520) for selection. In some examples, ZTD service 530 can use the IoT device telemetry data usage requirement and the network traffic control policies to automatically generate and present a series of different provisioning policies (and/or selectable options thereof) to a user (e.g., enterprise 520) corresponding to various different selections for IoT hub 560. For example, ZTD service 530 can present a first set of provisioning policies (or selectable options thereof) that are derived to match the requirements of a first IoT hub and can present a second set of provisioning policies (or selectable options thereof) that are derived to match the requirements of a second IoT hub that is different from the first IoT hub. In this manner, users such as enterprise 520 can utilize ZTD service 530 to automatically generate and select (e.g., using one or more selectable options) from different provisioning policies with the knowledge that each of the automatically generated provisioning policies will satisfy the specific requirements, restrictions, limitations, policies, etc., of both the cellular service provider associated with network 500 and the IoT hub provider associated with IoT hub 560, while also satisfying the IoT device telemetry data usage requirement(s) that are also defined in ZTD service 530.

In some embodiments, the IoT device telemetry data usage requirement can be based at least in part on predetermined information that is associated with one or more of an IoT device type (e.g., a device type identifier associated with particular ones of IoT devices 510) and/or a use-case associated with particular ones of IoT devices 510, etc. In some cases, the IoT device telemetry data usage requirement can be based at least in part on information received from or provided as input by a user of ZTD service 530 (e.g., enterprise 520). The IoT device telemetry data usage requirement can additionally, or alternatively, be based on a combination of the two. In some examples, ZTD service 530 can automatically monitor and determine a historical data usage pattern or trend for one or more (or all) of IoT devices 510. For example, ZTD service 530 can determine the IoT device telemetry data usage requirement for a given one of IoT devices 510 based at least in part on an average data consumption of the given IoT device 510 over some time interval, such as the past 7 days, 14 days, 30 days, etc. In some cases, ZTD service 530 can determine the IoT device telemetry data usage requirement for a given one of IoT devices 510 based on a combination of the IoT device's average data consumption and the IoT device's peak data consumption over some time interval.

At step 6, after receiving a selection of one of the adaptive network traffic policies presented by ZTD service 530 (e.g., the provisioning policies described above), ZTD service 530 may automatically configure one or more IoT devices 510 with the appropriate policies, as will be described below with respect to steps 7-11. It is noted that the configuration of IoT devices 510 with a selected policy can be performed asynchronously or at some time subsequent to the actions described above with respect to steps 1-5. In other words, steps 7-11 can be performed in succession with steps 1-5 or can be performed at some later time.

For example, ZTD service 530 can configure one or more of IoT devices 510 with a selected policy as part of a zero-touch deployment process, wherein an IoT device receives a selected policy from ZTD service 530 in response to the IoT device first being deployed or otherwise coming online (e.g., ZTD service 530 can automatically configure the IoT device with the policy on day zero, when the device is first used, powered on, connected to network 500, etc.). In some embodiments, day zero for one or more of IoT devices 510 can correspond to the time at which the IoT device is first powered on by an end user such as enterprise 520. In some examples, day zero for one or more of IoT devices 510 can correspond to a time prior to the IoT device being provided to an end user such as enterprise 520. For example, day zero can correspond approximately to a time of manufacture of an IoT device.

In some embodiments, ZTD service 530 can be used to configure one or more of IoT devices 510 with a selected policy after the IoT device has already been deployed. In other words, ZTD service 530 can push adaptive network traffic policies (or updates thereto) to one or more of IoT devices 510 after the IoT device has already been operational or live in-field for some period of time beforehand. In such scenarios, ZTD service 530 can, in some embodiments, automatically configure already deployed IoT devices with a new or updated policy in response to the completion of steps 1-5 above.

Accordingly, it is contemplated that the process of configuring one or more of IoT devices 510 with a network traffic policy generated and/or selected as described above with respect to steps 1-5 can begin with IoT device(s) 510 attempting to connect to ZTD service 530. The initial connection process between IoT devices 510 and ZTD service 530 can include one or more authentication processes, in which each IoT device 510 authenticates with ZTD service 530.

At step 7, in response to a successful authentication of the one or more IoT devices 510, ZTD service 530 can obtain operational certificates for IoT devices 510. In some examples, ZTD service 530 can obtain the operational certificates in response to a request from IoT devices 510. ZTD service 530 can additionally, or alternatively, obtain the operational certificates automatically in response to a successful authentication in step (6) of IoT devices 510. In some embodiments, the operational certificate can be obtained via an Enrollment over Secure Transport (EST) protocol, or other certificate management protocol implemented by ZTD service 530. In some examples, the operational certificate can be utilized by IoT devices 510 to communicate with IoT hub 560 (e.g., send telemetry data).

At step 8, ZTD service 530 can obtain device x509 certificates from a certificate authority (CA) 550. In some embodiments, CA 550 can be provided by or managed by an entity separate from one or more (or all) of enterprise 520, the cellular network provider, the IoT hub provider, and/or ZTD service 530. In some embodiments, CA 550 can be provided by or otherwise combined with ZTD service 530. In some cases, CA 550 can be provided by or associated with the user of IoT devices 510, e.g., CA 550 can be provided by or associated with enterprise 520.

At step 9, ZTD service 530 can subsequently apply the selected network traffic control policy or policies (e.g., from steps (4) and (5)) to IoT devices 510. For example, ZTD service 530 can utilize device information of IoT devices 510 to automatically determine or obtain one or more previously selected network traffic control policies for particular ones of IoT devices 510. Based at least in part on this device information, ZTD service 530 can then apply the appropriate network traffic control policy for each of IoT devices 510.

In some embodiments, ZTD service 530 applies the appropriate network traffic control policy for each IoT device 510 via CMP 540 (configuration management platform). As discussed previously, CMP 540 can be associated with or provided by cellular network 500 in which IoT devices 510 will operate or otherwise use to transmit and receive data.

At step 10, the device certificates are returned to each of IoT devices 510. In some embodiments, the device certificates can be transmitted to IoT devices 510 using CMP 540. In some embodiments, the device certificates can be transmitted to IoT devices 510 by CA 550 or by ZTD service 530. Although depicted as a separate step in the example process flow of FIG. 5, it is noted that the network traffic control policy of step (9) can be applied at approximately the same time as the return of the device certificates in step (10). In some examples, it is contemplated that the network traffic control policy/policies for IoT devices 510 can be applied in CMP 540 synchronously or simultaneously with the transmission of the device certificates to IoT devices 510, without departing from the scope of the present disclosure.

At step 11, after receiving the device certificates in step (10), IoT devices 510 can use the device certificates to connect to IoT hub 560. Upon successful connection with IoT hub 560, IoT devices 510 can begin operation, e.g., can begin transmitting data to IoT hub 560. Based on the network traffic control policies applied in CMP 540 for the various IoT devices 510 (e.g., in step (9)), the communication of data between IoT devices 510 and IoT hub 560 that is performed using the cellular network 500 is controlled based on the combination of each IoT device's specific telemetry data usage needs, the network traffic control policies in place between enterprise 520 and the cellular service provider, and the traffic quotas/requirements associated with the particular IoT hub 560.

As disclosed herein, ZTD service 530 can be used to provide adaptive network traffic control policies for a plurality of IoT devices 510, wherein the adaptive network traffic control policies are responsive to a combination of one or more of IoT device data usage needs or patterns, cellular network traffic policies or restrictions, and IoT hub traffic policies or restrictions. The adaptive network traffic control policies can be applied to IoT devices on an individual basis, across groups or sets of multiple IoT devices, or some combination of the two. ZTD service 530 can automatically provide coordination and synchronization between policies and restrictions established by IoT hub 560 and policies and restrictions established with respect to data traffic on cellular network 500. The adaptive network traffic control policies can be automatically updated or modified responsive to changes in one or more of IoT device 510 software or firmware, IoT device 510 use case or deployment scenario, the particular policies and restrictions on data traffic over network 500, and/or the particular policies and restrictions on input data traffic to IoT hub 560.

The adaptive network traffic control policies can be applied in a less than day zero approach, in which the policies to be applied are determined, generated or selected prior to the IoT device day zero. In some embodiments, the adaptive network traffic control policies can be applied in a day zero approach, in which the policies are applied on the IoT device day zero. In some examples, the adaptive network traffic control policies can be applied in a late-binding fashion, e.g., throughout the lifetime or deployment of IoT devices 510 in the form of new or updated network traffic control policies being applied to replace existing policies for one or more of IoT devices 510. For instance, ZTD service 530 can be used to perform lifecycle management for one or more of IoT devices 510, wherein new or updated network traffic control policies are applied or associated to particular ones of IoT devices 510 dynamically in the field. Accordingly, it is contemplated that ZTD service 530 can be used as both a bootstrapping (e.g., one-time) service for managing and applying network traffic control policies to IoT devices and/or can be used as a lifecycle management (e.g., dynamic and continuous) to provide adaptive network traffic control policies that are dynamic and late-binding, permitting users (e.g., enterprise 520) to manage and control their IoT devices 510 contextually, after initial deployment.

Figure 6:
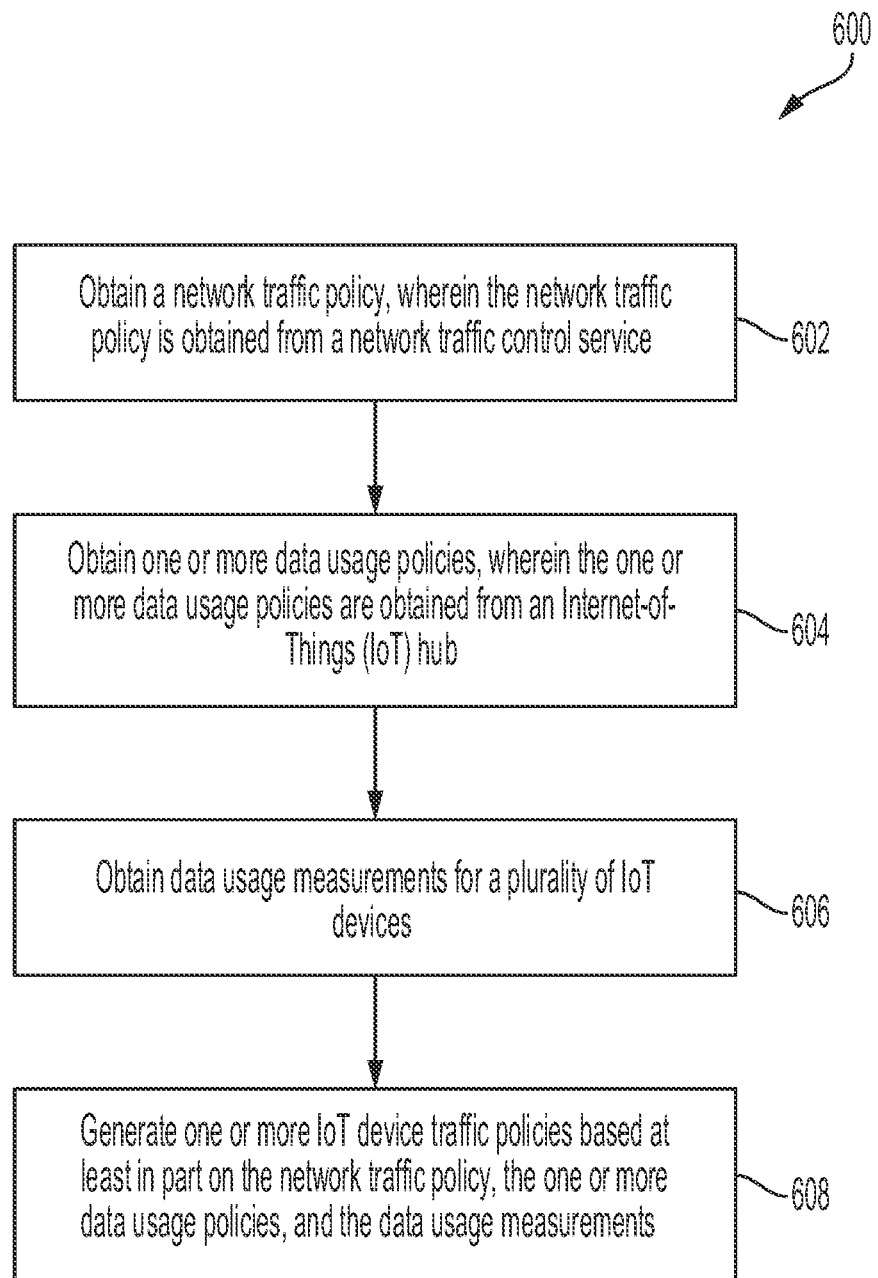
FIG. 6 illustrates an example method for generating IoT device adaptive network traffic control policies, according to some aspects of the present disclosure.
Figure 7:
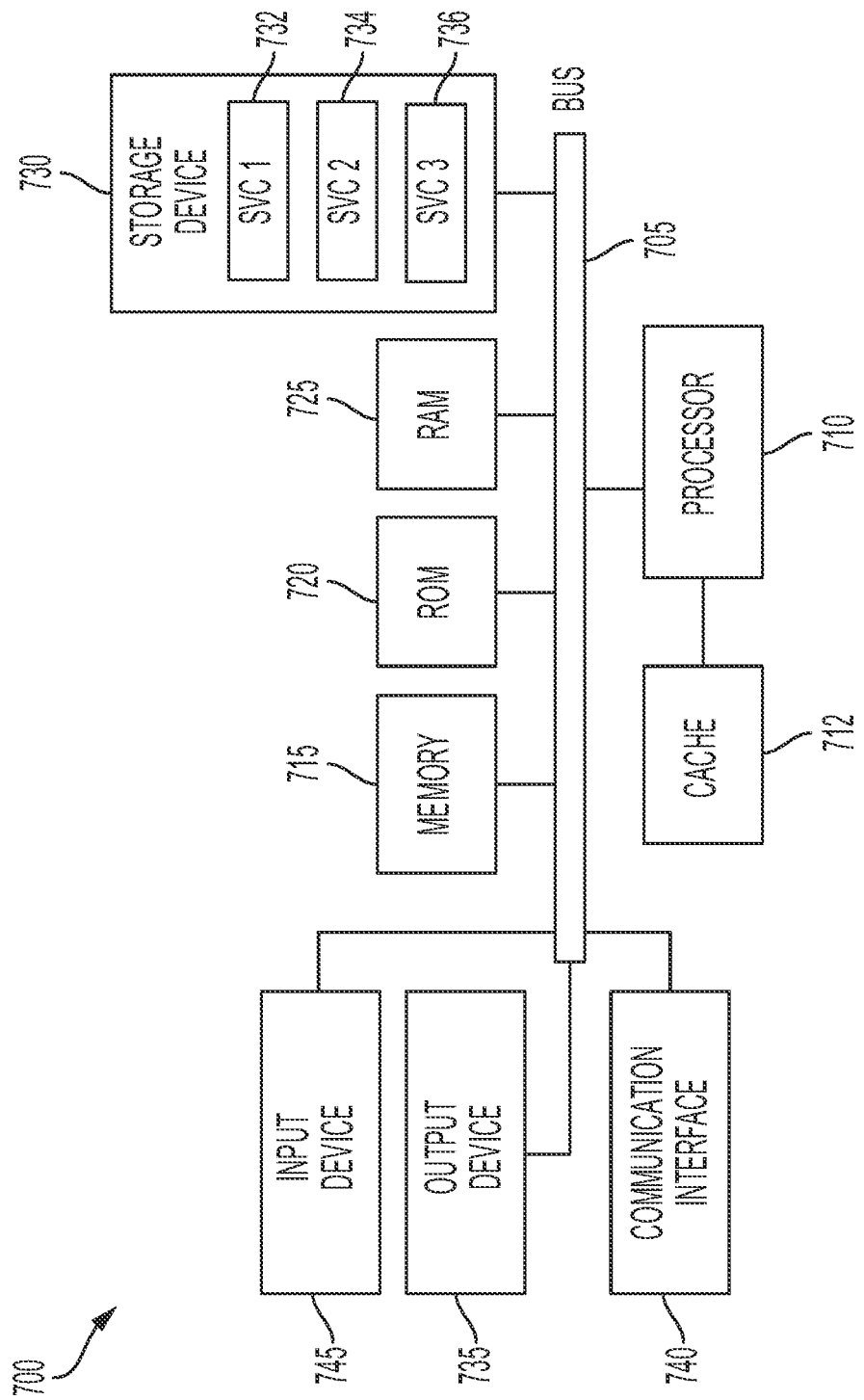
FIG. 7 illustrates an example system for implementing certain aspects of the present technology, according to some aspects of the present disclosure.

FIG. 6 illustrates a flowchart of an example method for generating IoT device traffic policies, according to some aspects of the present disclosure. FIG. 6 will be described below from the perspective of a ZTD service (e.g., ZTD service 530 illustrated in FIG. 5). However, it is understood that example method 600 of FIG. 6 can also be implemented using one or more processors and memories having computer-readable instructions stored thereon, which when executed by the one or more processors cause the one or more processors to perform operations including some or all of method 600. Although method 600 depicts a particular sequence of operations, the sequence may be altered without departing from the scope of the present disclosure. For example, some of the operations depicted may be performed in parallel or in a different sequence that does not materially affect the function of method 600. In other examples, different components of an example device or system that implements method 600 may perform functions at substantially the same time or in a specific sequence.

According to some embodiments, the method 600 includes obtaining, by a ZTD service (e.g., ZTD service 530 illustrated in FIG. 5), a network traffic policy at step 602. In some examples, the network traffic policy can be obtained from a network traffic control service. For example, the network traffic policy can be obtained from a network traffic control service such as CMP 540 illustrated in FIG. 5. In some examples, the network traffic policy can be obtained or otherwise fetched by ZTD service 530 illustrated in FIG. 5. The network traffic policy can be defined in the network traffic control service by an enterprise or user (e.g., enterprise 520 illustrated in FIG. 5). In some embodiments, the network traffic policy can be defined in the network traffic control service by a cellular service provider or operator associated with a wireless communication network to which the network traffic policy corresponds. For example, the network traffic policy can include or be based on one or more agreed-upon or pre-determined charging rules, parameters, etc., between an enterprise and a cellular network service provider. In some examples, the network traffic policies can be implemented in a cellular network by a Policy and Charging Rules Function (PCRF), a Policy Control Function (PCF), and/or other Network Functions (NFs) included in or associated with the cellular network.

The method 600 further includes, obtaining, by a ZTD service (e.g., ZTD service 530 illustrated in FIG. 5), one or more data usage policies at step 604, wherein the one or more data usage policies are obtained from an IoT hub or datacenter. For example, the one or more data usage policies can be obtained from IoT hub 560 illustrated in FIG. 5. In some cases, obtaining the one or more data usage policies includes obtaining one or more input traffic quota requirements from the IoT hub. In some embodiments, a pseudo IoT hub can be created based on the obtained data usage policies and/or an identification of a particular IoT hub from which the data usage policies are obtained. Input traffic quota requirements can be associated with IoT hub 560 and can include, but are not limited to, a plurality of different requirements, restrictions, charging policies, etc., applied by the IoT hub to input data traffic, such as data generated by the IoT devices and transmitted to the IoT hub. For example, traffic quota requirements associated with an IoT hub can include factors such as a number of messages, a size of messages, geographic sectors or locations of transmission, etc.

The method 600 further includes, obtaining, by a ZTD service (e.g., ZTD service 530 illustrated in FIG. 5), data usage measurements for a plurality of IoT devices at step 606. For example, data usage measurements can be obtained for a plurality of IoT devices that include IoT devices 510 illustrated in FIG. 5. In some embodiments, the data usage measurements can include IoT device telemetry data usage requirements. IoT device telemetry data usage requirements can be based at least in part on pre-determined information that is associated with one or more of an IoT device type and/or a use-case associated with particular ones of the IoT devices. In some cases, the IoT device telemetry data usage requirement can be based at least in part on information received from or provided as input by a user. The IoT device telemetry data usage requirement can additionally, or alternatively, be based on a combination of the two. In some examples, the IoT device telemetry data usage requirement can be determined based at least in part on automatically monitoring and analyzing a historical data usage pattern or trend for one or more (or all) of the IoT devices. For example, ZTD service 530 illustrated in FIG. 5 can determine the IoT device telemetry data usage requirement for a given one of IoT devices 510 based at least in part on an average data consumption of the given IoT device 510 over some time interval, such as the past 7 days, 14 days, 30 days, etc.

The method 600 further includes generating, by a ZTD service (e.g., ZTD service 530 illustrated in FIG. 5), one or more IoT device traffic policies based at least in part on the network traffic policy, the data usage policies, and the data usage measurements, at step 608. For example, one or more IoT device traffic policies can be automatically generated by ZTD service 530 illustrated in FIG. 5. In some embodiments, the generated IoT device traffic policies can be provisioning policies. The automatically generated provisioning policies can be presented to a user (e.g., enterprise 520 illustrated in FIG. 5) for selection. In some embodiments, an automatic selection can be made from the generated provisioning policy based on determining that one or more conditions have been met by at least a portion (e.g., a subset) of the plurality of IoT devices. For example, different provisioning policies can be generated, selected from, and/or applied to one or more IoT devices such that each of the automatically generated provisioning policies will satisfy the specific requirements, restrictions, limitations, policies, etc., of both the cellular service provider associated with a wireless network associated with the IoT devices and of the IoT hub provider associated with an IoT hub, while also satisfying IoT device telemetry data usage requirement(s) that are dynamically and adaptively determined for the IoT devices.

FIG. 7 illustrates a computing system architecture, according to some aspects of the present disclosure. Components of computing system architecture 700 are in electrical communication with each other using a connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   obtaining a network traffic policy, wherein the network traffic policy is obtained from a network traffic control service;
   obtaining one or more data usage policies, wherein the one or more data usage policies are obtained from an Internet-of-Things (IoT) hub;
   obtaining data usage measurements for a plurality of IoT devices; and
   generating one or more IoT device traffic policies based at least in part on the network traffic policy, the one or more data usage policies, and the data usage measurements.

2. The method of claim 1, wherein obtaining the one or more data usage policies includes obtaining one or more input traffic quota requirements from the IoT hub.

3. The method of claim 1, further comprising:
   receiving a selection from the one or more IoT device traffic policies; and
   automatically applying the selected IoT device traffic policy to one or more IoT devices in response to determining that one or more conditions associated with the selected IoT device traffic policy are met.

4. The method of claim 3, wherein:
   the one or more IoT device traffic policies are automatically generated by a zero-touch deployment (ZTD) service;
   the ZTD service automatically selects at least one of the one or more IoT device traffic policies in response to detecting an initial deployment of the one or more IoT devices; and
   the data usage measurements include a telemetry data usage requirement determined for the one or more IoT devices at the initial deployment.

5. The method of claim 3, wherein:
   the one or more IoT device traffic policies are specified at a portal of a zero-touch deployment (ZTD) service, the portal providing a selectable option for each of the one or more IoT device traffic policies.

6. The method of claim 4, further comprising determining the telemetry data usage requirement based on one or more of a set of device identifiers associated with the one or more IoT devices or a historical telemetry data usage pattern measured for the one or more IoT devices.

7. The method of claim 3, wherein:
   a selected IoT device traffic policy is an adaptive IoT device traffic policy including one or more policy updates;
   the one or more IoT devices are previously deployed IoT devices; and
   automatically applying the selected IoT device traffic policy comprises automatically updating an existing IoT device traffic policy associated with the previously deployed IoT devices using the one or more policy updates.

8. The method of claim 1, wherein:
   the network traffic policy is obtained from one or more of a Policy and Charging Rules Function (PCRF) or a Policy Control Function (PCF) associated with a cellular network; and
   the data usage measurements for the plurality of IoT devices include data usage of the plurality of IoT devices on the cellular network.

9. A system comprising:
   one or more processors; and
   one or more computer-readable storage media having computer-readable instructions stored thereon, wherein the computer-readable instructions, when executed by the one or more processors, cause the one or more processors to:
   obtain a network traffic policy, wherein the network traffic policy is obtained from a network traffic control service;

obtain one or more data usage policies, wherein the one or more data usage policies are obtained from an Internet-of-Things (IoT) hub;

obtain data usage measurements for a plurality of IoT devices; and generate one or more IoT device traffic policies based at least in part on the network traffic policy, the one or more data usage policies, and the data usage measurements.

10. The system of claim 9, wherein obtaining the one or more data usage policies includes obtaining one or more input traffic quota requirements from the IoT hub.

11. The system of claim 9, wherein the computer-readable instructions further cause the one or more processors to:

receive a selection from the one or more IoT device traffic policies; and automatically apply the selected IoT device traffic policy to one or more IoT devices in response to determining that one or more conditions associated with the selected IoT device traffic policy are met.

12. The system of claim 11, wherein:

the one or more IoT device traffic policies are automatically generated by a zero-touch deployment (ZTD) service;

the ZTD service automatically selects at least one of the one or more IoT device traffic policies in response to detecting an initial deployment of the one or more IoT devices; and the data usage measurements include a telemetry data usage requirement determined for the one or more IoT devices at the initial deployment.

13. The system of claim 11, wherein:

the one or more IoT device traffic policies are specified at a portal of a zero-touch deployment (ZTD) service, the portal providing a selectable option for each of the one or more IoT device traffic policies.

14. The system of claim 12, wherein the computer-readable instructions further cause the one or more processors to:

determine the telemetry data usage requirement based on one or more of a set of device identifiers associated with the one or more IoT devices or a historical telemetry data usage pattern measured for the one or more IoT devices.

15. The system of claim 11, wherein:

a selected IoT device traffic policy is an adaptive IoT device traffic policy including one or more policy updates;

the one or more IoT devices are previously deployed IoT devices; and the computer-readable instructions cause the one or more processors to automatically apply the selected IoT device traffic policy by automatically updating an existing IoT device traffic policy associated with the previously deployed IoT devices using the one or more policy updates.

16. The system of claim 9, wherein:

the network traffic policy is obtained from one or more of a Policy and Charging Rules Function (PCRF) or a Policy Control Function (PCF) associated with a cellular network; and the data usage measurements for the plurality of IoT devices include data usage of the plurality of IoT devices on the cellular network.

17. One or more non-transitory computer-readable media comprising computer-readable instructions, which when executed by one or more processors of a cloud-based deployment service, cause the cloud-based deployment service to:

obtain a network traffic policy, wherein the network traffic policy is obtained from a network traffic control service;

obtain one or more data usage policies, wherein the one or more data usage policies are obtained from an Internet-of-Things (IoT) hub;

obtain data usage measurements for a plurality of IoT devices; and generate one or more IoT device traffic policies based at least in part on the network traffic policy, the one or more data usage policies, and the data usage measurements.

18. The one or more non-transitory computer-readable media of claim 17, wherein the computer-readable instructions further cause the cloud-based deployment service to:

receive a selection from the generated one or more IoT device traffic policies; and automatically apply the selected IoT device traffic policy to one or more IoT devices in response to determining that one or more conditions associated with the selected IoT device traffic policy are met.

19. The one or more non-transitory computer-readable storage media of claim 18, wherein:

the one or more IoT device traffic policies are automatically generated by a zero-touch deployment (ZTD) service;

the ZTD service automatically selects at least one of the one or more IoT device traffic policies in response to detecting an initial deployment of the one or more IoT devices; and the data usage measurements include a telemetry data usage requirement determined for the one or more IoT devices at the initial deployment.

20. The one or more non-transitory computer-readable storage media of claim 19, wherein the computer-readable instructions further cause the cloud-based deployment service to:

determine the telemetry data usage requirement based on one or more of a set of device identifiers associated with the one or more IoT devices or a historical telemetry data usage pattern measured for the one or more IoT devices.

* * * * *